(12) United States Patent
Sakai et al.

(10) Patent No.: US 11,845,092 B2
(45) Date of Patent: Dec. 19, 2023

(54) VEHICLE WASHING DEVICE

(71) Applicant: KOITO MANUFACTURING CO., LTD., Tokyo (JP)

(72) Inventors: Masaru Sakai, Shizuoka (JP); Yasuhiro Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 282 days.

(21) Appl. No.: 17/348,864

(22) Filed: Jun. 16, 2021

(65) Prior Publication Data
US 2021/0394204 A1 Dec. 23, 2021

(30) Foreign Application Priority Data

Jun. 18, 2020 (JP) .................... 2020-105610

(51) Int. Cl.
  *B05B 1/30* (2006.01)
  *B05B 1/14* (2006.01)
  *B60S 1/66* (2006.01)

(52) U.S. Cl.
  CPC .............. *B05B 1/3006* (2013.01); *B05B 1/14* (2013.01); *B60S 1/66* (2013.01)

(58) Field of Classification Search
  CPC ............ B05B 1/3006; B05B 1/14; B60S 1/66
  USPC .......................................... 239/284.1, 284.2
  See application file for complete search history.

(56) References Cited

U.S. PATENT DOCUMENTS

| 5,762,271 | A * | 6/1998 | Lind ...................... | B05B 15/74 239/284.2 |
| 7,182,276 | B2 * | 2/2007 | Sakai ...................... | B60S 1/528 239/284.1 |
| 2001/0030874 | A1 * | 10/2001 | Nishiyama ........... | B60Q 1/0041 239/284.2 |
| 2003/0116645 | A1 * | 6/2003 | Hirose ................... | B60S 1/528 239/284.2 |
| 2005/0121539 | A1 * | 6/2005 | Takada .................... | B60S 1/528 239/284.2 |
| 2006/0113404 | A1 * | 6/2006 | Sato ........................ | B60S 1/528 239/284.1 |

FOREIGN PATENT DOCUMENTS

EP 2 511 144 A2 10/2012
JP 2012-218705 A 11/2012

* cited by examiner

*Primary Examiner* — Steven J Ganey
(74) *Attorney, Agent, or Firm* — Sughrue Mion, PLLC

(57) ABSTRACT

A vehicle washing device includes: a cylinder including a cylinder tube to which a washing fluid is supplied; a piston including a piston tube that is movably inserted into the cylinder tube and opens at both ends; and a spray nozzle that is mounted at a leading end, in an extension direction, of the piston tube protruding from the cylinder tube. The spray nozzle is configured to spray the washing fluid, supplied through the inside of the piston tube, toward an object-to-be-washed. The outer circumference of the spray nozzle is fitted on the inner circumference of the piston tube.

4 Claims, 5 Drawing Sheets

VEHICLE WASHING DEVICE

CROSS-REFERENCE TO RELATED APPLICATION

This application claims priority to Japanese Patent Application No. 2020-105610 filed on Jun. 18, 2020, incorporated herein by reference in its entirety.

BACKGROUND

1. Technical Field

The present invention relates to a vehicle washing device.

2. Description of Related Art

There are known vehicle washing devices that have a spray nozzle protruding through an opening formed in a vehicle body or a bumper to the outside and that wash an object-to-be-washed, such as a vehicle light, by spraying a fluid from the spray nozzle.

SUMMARY

As the housing space inside the vehicle body or behind the bumper is limited, it is desirable to reduce the overall length of the vehicle washing device in the moving direction of the spray nozzle.

The present invention has been contrived under these circumstances, and one of illustrative objects of an aspect of the invention is to reduce the overall length of a vehicle washing device.

One aspect of the present invention is a vehicle washing device. This vehicle washing device includes: a cylinder including a cylinder tube to which a washing fluid is supplied; a piston including a piston tube that is movably inserted into the cylinder tube and opens at both ends; and a spray nozzle that is mounted at a leading end, in an extension direction, of the piston tube protruding from the cylinder tube. The spray nozzle is configured to spray the washing fluid, supplied through the inside of the piston tube, toward an object-to-be-washed. The outer circumference of the spray nozzle is fitted on the inner circumference of the piston tube.

Arbitrary combinations of the above-described constituent elements, as well as a method, a device, a system, etc. having constituent elements and representations of the present invention interchanged among them are also valid as aspects of the present invention.

The above-described configuration can reduce the overall length of the vehicle washing device.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Figure 1:
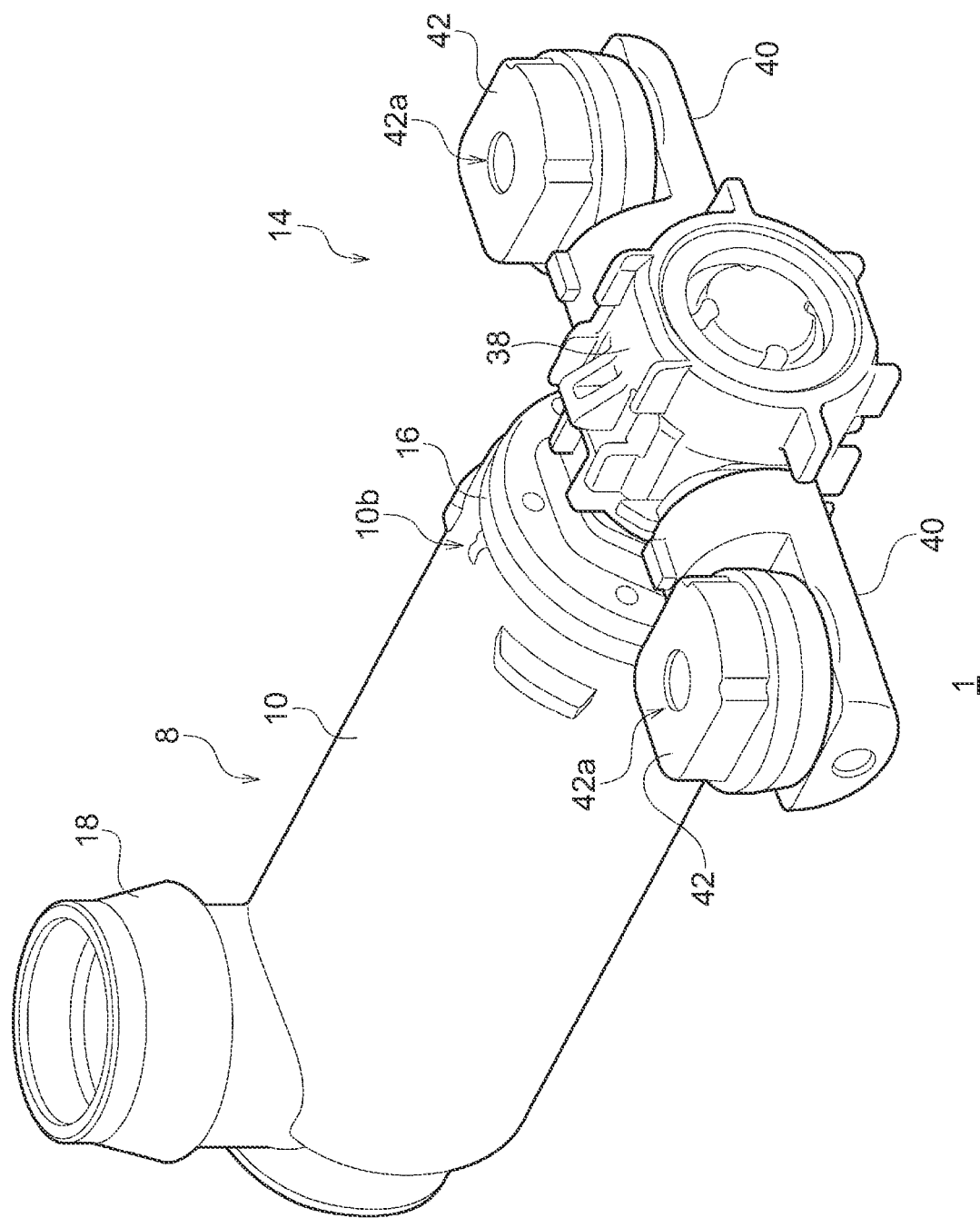
FIG. 1 is a perspective view of a vehicle washing device according to an embodiment.

The present invention will be described below based on a preferred embodiment with reference to the drawings. The embodiment is intended not to limit but to illustrate the present invention, and all the features and combinations thereof described in the embodiment are not necessarily essential to the invention. The same or equivalent constituent elements, members, and processes shown in the drawings will be denoted by the same reference signs and an overlapping description will be omitted as appropriate.

Figure 2:
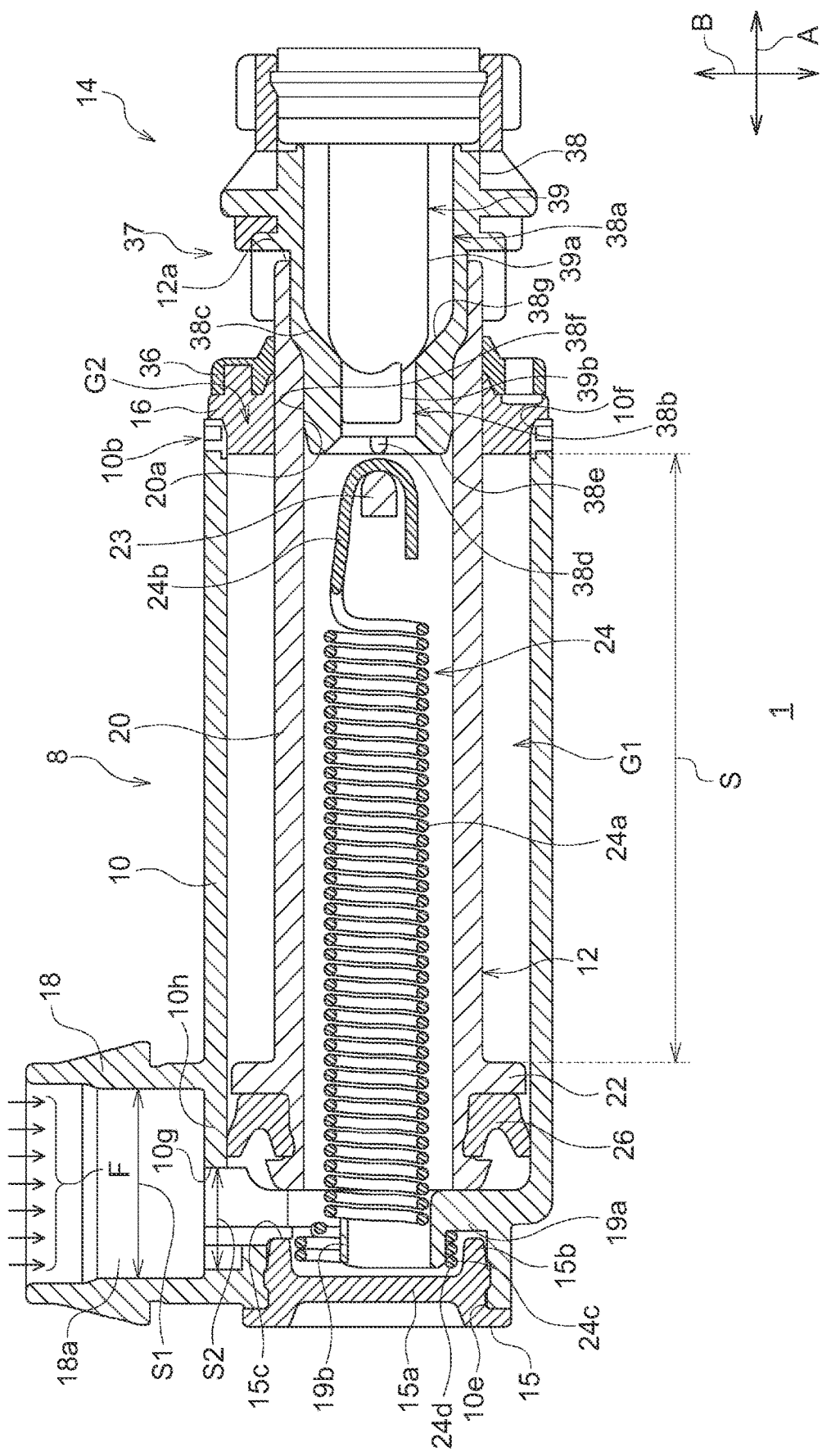
FIG. 2 is a longitudinal sectional view of the vehicle washing device according to the embodiment.
Figure 3:
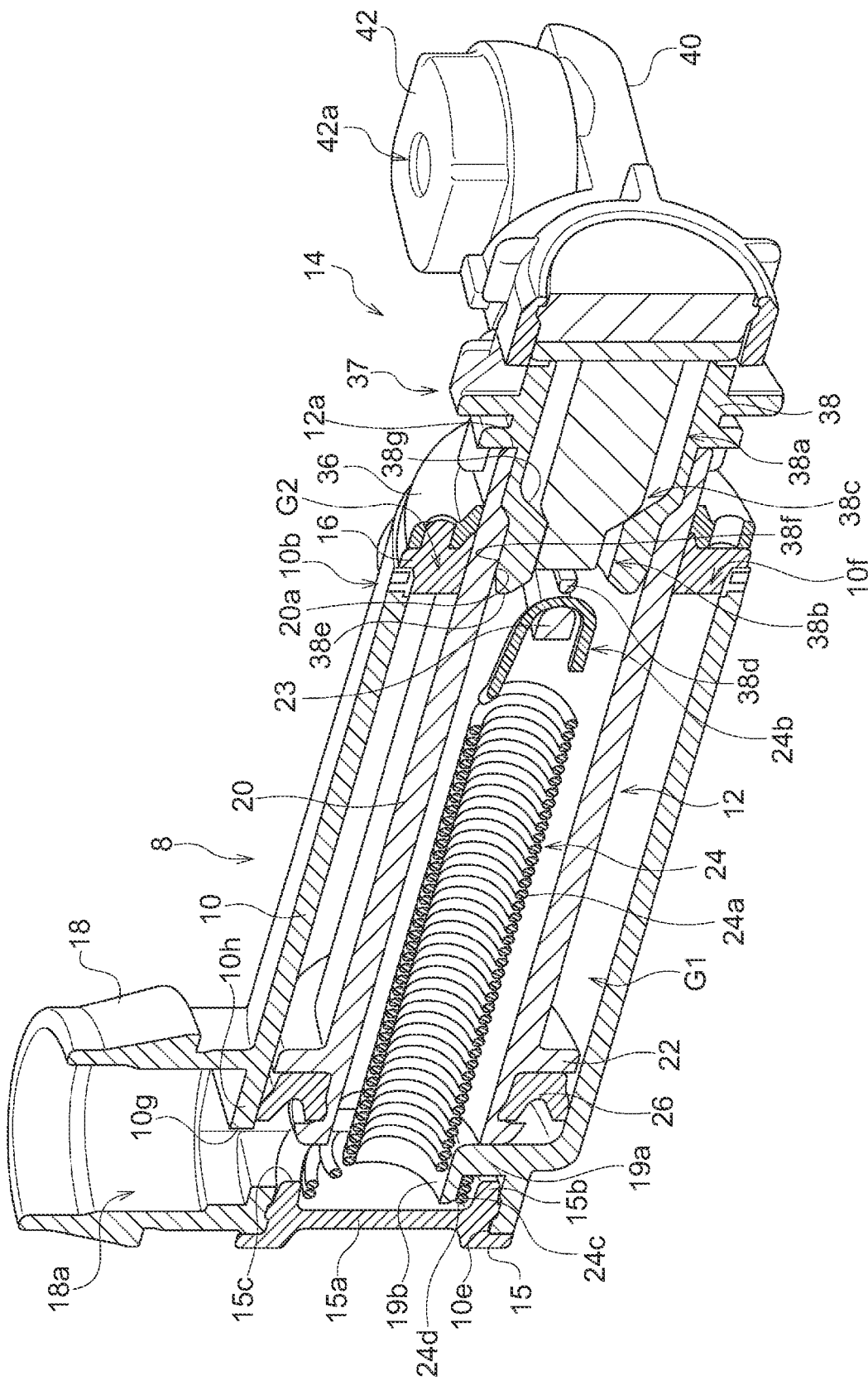
FIG. 3 is a perspective sectional view of the vehicle washing device according to the embodiment.

FIG. 1 to FIG. 3 are views showing a vehicle washing device 1 according to the embodiment. FIG. 1 is a perspective view of the vehicle washing device 1. FIG. 2 and FIG. 3 are a longitudinal sectional view and a perspective sectional view of the vehicle washing device 1 cut along a vertical section including a central axis of a cylinder tube 10.

The vehicle washing device 1 includes a cylinder 8, a piston 12 that is slidably inserted into the cylinder 8, and a spray nozzle 14 that is mounted at a leading end 12a of the piston 12 (i.e., a front end of a piston tube 20) and sprays a washing fluid (e.g., a washing liquid) F toward an object-to-be-washed.

The vehicle washing device 1 is housed inside a vehicle body or behind a bumper, and when washing an object-to-be-washed, the vehicle washing device 1 protrudes the spray nozzle 14 from the vehicle body or the bumper to an outside and sprays the washing fluid F from the spray nozzle 14 to wash the object-to-be-washed. The object-to-be-washed may be, for example, a casing cover containing at least one of a lighting unit, a camera, and a sensor (e.g., an LiDAR sensor), or may also be, for example, a vehicle body, a window, or a mirror.

Hereinafter, a direction in which the cylinder tube 10 of the cylinder 8 and the piston tube 20 of the piston 12 extend will be referred to as an axial direction A. A direction that passes through central axes of the cylinder tube 10 and the piston tube 20 and is perpendicular to these central axes (i.e., a direction orthogonal to the axial direction A, and therefore orthogonal to the extension direction of the cylinder tube 10 and the piston tube 20) will be referred to as a radial direction B. A side in the axial direction A on which the spray nozzle 14 is provided relative to the piston tube 20 will be referred to as a front side, and a side opposite from the front side (i.e., a side opposite from the spray nozzle) will be referred to as a rear side. The axial direction A corresponds to a direction in which the piston 12 and the spray nozzle 14 move. These designations do not limit postures in which the vehicle washing device 1 is used, and the vehicle washing device 1 can be used in arbitrary postures.

The cylinder 8 includes: the cylinder tube 10 having a cylindrical shape; a cylindrical coupling part 18 that is coupled to an outer circumference, near a rear end, of the cylinder tube 10, and from there extends vertically upward (i.e., in a direction orthogonal to the axial direction A); and a spring support 19 that is provided inside the cylinder tube 10, on a rear end side thereof. In the shown example, the coupling part 18 is coupled to the rear end of the outer circumference of the cylinder tube 10.

The cylinder tube 10 opens at both ends in the axial direction A. An inflow opening 10g that opens to an inside of the coupling part 18 is formed in the outer circumference of the cylinder tube 10. An inside of the cylinder tube 10 and the inside of the coupling part 18 communicate with each other through the inflow opening 10g. The inflow opening 10g has an opening area S2 that is smaller than a flow passage area S1 of a flow passage 18a inside the coupling part 18. The flow passage area S1 refers to a sectional area in a direction orthogonal to an up-down direction that is an extension direction of the coupling part 18. The inflow opening opens near a rear side of the inside of the coupling part 18. The cylinder tube 10 has an opposing part 10h that faces a front side, in a width direction, of the flow passage 18a extending in the up-down direction.

A tube (not shown) is coupled to the coupling part 18. This tube is coupled to a washing fluid storage tank (not shown) that is disposed inside the vehicle body. The washing fluid F sent out from the washing fluid storage tank passes through the tube and the coupling part 18 and flows into the cylinder tube 10 through the inflow opening 10g. In this embodiment, as described above, the coupling part 18 extends from the outer circumference of the cylinder tube 10 in the direction orthogonal to the axial direction A. Thus, compared with when the coupling part extends from a rear end of the cylinder tube toward the rear side in the axial direction as in conventional vehicle washing devices, the overall length of the vehicle washing device 1 in the axial direction A can be reduced without the length of stroke of the piston 12 being reduced.

The spring support 19 includes a spring bearing part 19a that projects radially inward from a rear end side of the inside of the cylinder tube 10, and a spring fitting part 19b that extends from a radially inner side of the spring bearing part 19a toward the rear side in the axial direction. The spring bearing part 19a has a semicircular shape as seen from the axial direction A. The spring fitting part 19b has a substantially semicylindrical shape.

The piston 12 includes: the cylindrical piston tube 20; an annular flange 22 that projects radially outward from a position on a rear end side of the piston tube 20; and a spring hook 23 that protrudes toward the inner side of the piston tube 20 on a front end side of the piston tube 20. The piston tube 20 is movably inserted into the cylinder tube 10. The piston tube 20 opens at both ends in the axial direction A. The piston tube 20 is an angular tube with a polygonal (here, hexagonal) cross-section, but may instead be a cylinder with a circular cross-section.

A spring 24 is housed inside the piston tube 20. The spring 24 is a helical extension spring. The spring 24 has a main body 24a that is wound at a fixed diameter, a catching part 24b that is formed in a hook shape on a front end side of the main body 24a, and an annular engaging part 24c that is formed on a rear end side of the main body 24a and wound at a larger diameter than the main body 24a.

The spring 24 is inserted into the piston tube 20 from the rear side through an opening 10e at the rear end of the cylinder tube 10. The catching part 24b is engaged with the spring hook 23 of the piston 12 by being hung on the spring hook 23. The annular engaging part 24c is fitted around the spring fitting part 19b of the spring support 19 of the cylinder 8 and rests on the spring bearing part 19a. Thus, the spring 24 is fixed at a front end to the piston 12 and at a rear end to the cylinder 8. Therefore, the piston 12 is urged by the spring 24 toward the rear side in the axial direction relative to the cylinder 8, i.e., in a direction in which the piston 12 is housed in the cylinder tube 10.

The opening 10e at the rear end of the cylinder tube 10 is closed by a first cap 15. The first cap 15 includes a disc part 15a and an annular protrusion 15b that protrudes from a front surface of the disc part 15a toward the front side in the axial direction. The annular protrusion 15b encloses the spring fitting part 19b and the annular engaging part 24c. The first cap 15 restricts rearward movement of the annular engaging part 24c to prevent the annular engaging part 24c from coming off the spring support 19.

When the vehicle washing device 1 is not washing, the piston 12 is held at a rear end of movement thereof (the position in FIG. 1 and FIG. 2) by the urging force of the spring 24. The position of the piston 12 in this state is also called a housing position. Also when the piston 12 is in the housed position, a front end portion of the piston tube 20 protrudes toward the front side in the axial direction through an opening 10f at the front end of the cylinder tube 10, i.e., is located outside the cylinder tube 10. The washing fluid F having flowed into the cylinder tube 10 flows into the piston tube 20.

An annular seal member 26 is mounted on the rear side of the flange 22. The seal member 26 is made of an elastically deformable material, such as a rubber material. The seal member 26 is fitted around the piston tube 20 and moves along with the piston tube 20. The outside diameter of the seal member 26 is set to be slightly larger than the inside diameter of the cylinder tube 10, and an outer circumferential part of the seal member 26 fits closely on an inner circumferential surface 10a of the cylinder tube 10. Thus, when the washing fluid F is supplied to the cylinder tube 10, the washing fluid F is prevented from flowing into a gap G1 between the cylinder tube 10 and the piston tube 20 in the radial direction B on the front side from the seal member 26.

A gap G2 between the cylinder tube 10 and the piston tube 20 in the opening 10f at the front end of the cylinder tube 10 is closed by a second cap 16. The second cap 16 includes an annular part 30 and a tubular part 32 that extends from the annular part 30 toward the rear side in the axial direction. The annular part 30 is fitted around the piston tube 20. The outside diameter of the annular part 30 is set to be larger than the inside diameter of the cylinder tube 10. The second cap 16 closes the gap G2 between the cylinder tube 10 and the piston tube 20 in the opening of the cylinder tube 10 by being mounted such that the annular part 30 comes into contact with the front end of the cylinder tube 10.

The tubular part 32 of the second cap 16 is located inside the cylinder tube 10 so as to enclose the piston tube 20. The tubular part 32 of the second cap 16 is fitted around the piston tube 20. The outside diameter of the tubular part 32 of the second cap 16 is set to be equal to the inside diameter of the cylinder tube 10. During washing, the piston 12 moves toward the front side in the axial direction until the flange 22 hits a rear end 32a of the tubular part 32 of the second cap 16.

The cylinder tube 10 has, on the front end side, an air hole 10b by which the gap G1 between the cylinder tube 10 and the piston tube 20 communicates with an outside of the cylinder tube 10. The air hole 10b is a notch hole in the shown example but may instead be a through-hole. The air hole 10b provided lets air in and out of the gap G1, which allows the piston 12 to move.

A seal member 36 is mounted on the front side of the second cap 16. The seal member 36 is made of an elastically deformable material, such as a rubber material. The seal member 36 has an annular shape, and an inner circumferential surface 36a of the seal member 36 fits closely on the outer circumferential surface of the piston tube 20. Thus, a seal is created between the second cap 16 and the piston tube 20, so that dust, moisture, etc. are kept from entering the cylinder tube 10 as well as the washing fluid F is kept from leaking from the cylinder tube 10.

When the piston 12 is in the housed position and the coupling part 18 is seen from the radial direction B, a rear end portion 20b of the piston tube 20 overlaps with the flow passage 18a of the washing fluid F inside the coupling part 18. In the shown example, the rear end portion 20b of the piston tube 20 overlaps also with the inflow opening 10g. Thus, when the piston 12 is in the housed position, the rear end portion 20b of the piston tube 20 is located on the inner side of the flow passage 18a in the radial direction B, and in the shown example, moreover, located on the inner side of the inflow opening 10g in the radial direction B. In this case, the length in the axial direction A that the piston tube 20 protrudes from the cylinder tube 10 when the piston 12 is in the housed position is short, and thus the overall length of the vehicle washing device 1 in the axial direction A when the piston 12 is in the housed position can be reduced.

When the piston 12 is in the housed position and the coupling part 18 is seen from the radial direction B, the seal member 26 overlaps with the opposing part 10h, and further with the flow passage 18a. This means that when the piston 12 is in the housed position, the seal member 26 is located on the inner side of the opposing part 10h, and further of the flow passage 18a, in the radial direction B. In this case, the flange 22 can be provided so as to be located on a relatively rear side when the piston 12 is in the housed position. As a result, a distance S in the axial direction A between a front end 22a of the flange 22 and the rear end 32a of the tubular part 32 when the piston 12 is in the housed position, i.e., the length of stroke of the piston 12, can be increased. When the opposing part 10h is extended further toward the rear side in the axial direction, the seal member 26 can be located farther on the rear side in the axial direction. However, in proportion as the opposing part 10h is extended further toward the rear side in the axial direction, the opening area S2 of the inflow opening 10a becomes smaller. Therefore, the opening area S2 of the inflow opening 10g, and further the length of the opposing part 10h in the axial direction, should be determined such that a desired inflow rate can be achieved.

When the coupling part 18 is seen from the radial direction B, the annular engaging part 24c of the spring 24 overlaps with the flow passage 18a of the coupling part 18. This means that the annular engaging part 24c is located on the inner side of the flow passage 18a in the radial direction B. In the shown example, a rear end 24d of the annular engaging part 24c is located rearward of the inflow opening 10g in the axial direction. The annular protrusion 15b of the first cap 15 that encloses the spring fitting part 19b and the annular engaging part 24c is located on the inner side of the flow passage 18a of the coupling part 18 in the radial direction B. A front end 15c of the annular protrusion 15b is located on the inner side of the inflow opening 10g in the radial direction B. In these cases, the annular engaging part 24c of the spring 24 that is inserted through the opening 10e at the rear end of the cylinder tube 10 is fixed to the cylinder tube 10, at a position closer to the rear end thereof, and therefore the annular engaging part 24c can be fixed relatively easily.

The spray nozzle 14 includes a valve 37 that controls the flow of the washing fluid from the piston tube 20 to the spray nozzle 14, two nozzle holders 40, and two spray nozzles 42. The valve 37 includes a valve case 38 and a valve body 39. The valve case 38 has a tubular shape. A rear end of the valve case 38 is press-fitted into the piston tube 20, on the front end side thereof. Specifically, an outer circumference 38f on a rear end side of the valve case 38 is fitted on an inner circumference 20a on the front end side of the piston tube 20 such that a rear end 38e of the valve case 38 is located inside the piston tube 20. In the shown example, when the piston 12 is in the housed position, the rear end 38e of the valve case 38 reaches the radially inner side of the cylinder tube 10. Thus, when seen from the radial direction B, the rear end of the valve case 38 overlaps with the second cap 16 and the seal member 36.

Inside the valve case 38, a valve chamber 38a and a valve hole 38b that is provided on the rear side of the valve chamber 38a in the axial direction, continuously therewith, and has a smaller diameter than the valve chamber 38a are formed. A rear end side of an inner wall surface of the valve chamber 38a is tapered, and a rear end portion of a tapered surface 38g constitutes a valve seat 38c on which the valve body 39 rests. In this embodiment, the valve seat 38c is located on the radially inner side of the front end side of the piton tube 20. Further, in the shown example, when the piston 12 is in the housed position, the valve seat 38c is located on the radially inner side of the seal member 36. The valve seat 38c may be located farther on the rear side in the axial direction than in the shown example, and when the piston 12 is in the housed position, the valve seat 38c may be located on the radially inner side of the second cap 16 or on the radially inner side of the cylinder tube 10.

The valve case 38 has a restricting part 38d that protrudes inward at a rear end of the valve case 38. The restricting part 38d may come into contact with the catching part 24b of the spring 24 from the front side, or may be provided with a small clearance left between the restricting part 38d and the catching part 24b as shown in the drawings. The restricting part 38d faces the spring hook 23 in the axial direction A in this embodiment, but is not particularly limited to this example. The restricting part 38d restricts movement of the catching part 24b toward the front side in the axial direction so as to keep the catching part 24b and the spring hook 23 from disengaging from each other, i.e., keep the catching part 24b from coming off the spring hook 23.

The valve body 39 is made of, for example, an elastically deformable rubber material. The valve body 39 includes a valve main body 39a that is disposed in the valve chamber 38a and has a ball-shaped rear end, and a projection 39b that protrudes from the valve main body 39a toward the rear side in the axial direction and enters the valve hole 38b. The valve body 39 is urged toward the rear side in the axial direction by a spring (not shown), for example, a helical compression spring. Under the urging force of the spring, the valve main body 39a rests on the valve seat 38c. Thus, the valve 37 is closed. Then, the valve chamber 38a and, by extension, the nozzle holders 40 are shut off from the valve hole 38b and, by extension, the piston tube 20. (Communication between the former and the latter is blocked.)

When the washing fluid F having flowed into the piston tube 20 is supplied to the valve hole 38b and the pressure of the washing fluid F acting on the valve body 39 exceeds the urging force of the spring that urges the valve body 39, the valve body 39 moves away from the valve seat 38c against the urging force of the spring. Thus, the valve 37 is opened. Then, the valve chamber 38a and, by extension, the nozzle holders 40 communicate with the valve hole 38b and, by extension, the piston tube 20, so that the washing fluid F flows into the nozzle holders 40.

The nozzle holders 40 are turnably supported on lateral sides (left and right sides) of the valve case 38. Each nozzle holder 40 supports one spray nozzle 42. The washing fluid F having flowed into the nozzle holders 40 is sprayed through spray openings 42a of the spray nozzles 42.

A cover (not shown) is mounted on the front side of the spray nozzle 14. The cover closes an opening of the vehicle body or the bumper when the vehicle washing device 1 is not washing (i.e., when the piston 12 is in the housed position).

The basic configuration of the vehicle washing device 1 has been described above. Next, the operation of the vehicle washing device 1 will be described.

When the washing fluid F is supplied from the washing fluid storage tank to the cylinder tube 10 through the coupling part 18, the washing fluid F flows into the piston tube 20. As the flange 22 is subjected to the pressure of the washing fluid F, the piston 12 moves from the housed position toward the front side in the axial direction while stretching the spring 24. The spray nozzle 14 moves along with the piston 12 toward the front side in the axial direction and protrudes to the outside through the opening of the vehicle body or the bumper. When the piston 12 has moved to an end of movement thereof on the front side in the axial direction, specifically, when the flange 22 of the piston 12 hits the second cap 16, the movement of the piston 12 and the spray nozzle 14 toward the front side in the axial direction stops. When the movement of the piston 12 and the spray nozzle 14 toward the front side in the axial direction stops, the pressure of the washing fluid F inside the piston tube 20 rises as the washing fluid F is further supplied. As a result, the valve 37 opens and the washing fluid F flows into the nozzle holders 40, and the washing fluid F is sprayed toward the object-to-be-washed through the spray openings 42a of the spray nozzles 42.

When supply of the washing fluid F from the washing fluid storage tank stops, the pressure of the washing fluid F acting on the valve body 39 decreases. As a result, the valve 37 closes and the washing fluid F stops flowing into the nozzle holders 40, so that spraying of the washing fluid F from the spray nozzles 42 stops. When the pressure of the washing fluid F decreases further, the piston 12 and the spray nozzle 14 are moved toward the rear side in the axial direction by the urging force of the spring 24, and the piston 12 returns to the housed position.

Next, a method of assembling the vehicle washing device 1 will be described.

Figure 4A:
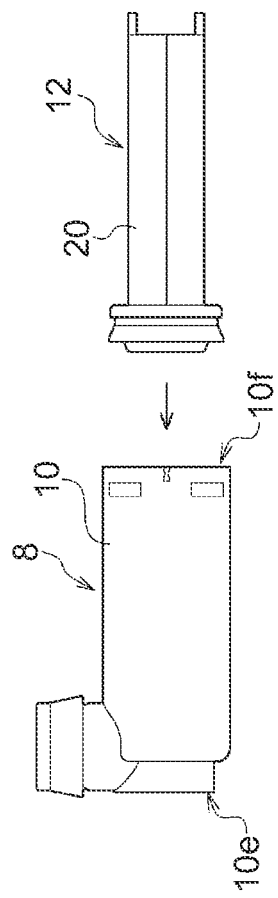
FIG. 4A is a view showing an assembly step of the vehicle washing device of FIG. 1.

FIG. 4A to FIG. 4D are views showing assembly steps of the vehicle washing device 1. As shown in FIG. 4A, the piston 12 is inserted into the cylinder tube 10 through the opening 10f at the front end of the cylinder tube 10.

Figure 4B:
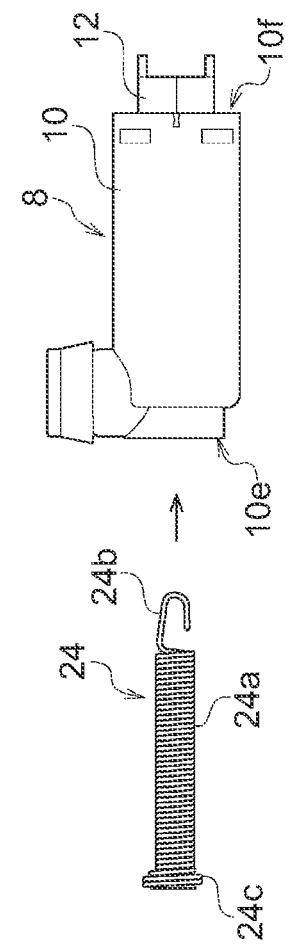
FIG. 4B is a view showing an assembly step of the vehicle washing device of FIG. 1.

As shown in FIG. 4B, the spring 24 is inserted into the piston tube 20 inside the cylinder tube 10 through the opening 10e at the rear end of the cylinder tube 10, and the catching part 24b of the spring 24 is engaged with the spring hook 23 (not shown in FIG. 4A to FIG. 4D) of the piston 12, and the annular engaging part 24c is engaged with the spring support 19 (not shown in FIG. 4A to FIG. 4D) of the cylinder 8. Thus, the spring 24 is inserted into the piston tube 20, and the front end and the rear end of the spring 24 are fixed to the piston 12 and the cylinder 8, respectively.

Figure 4C:
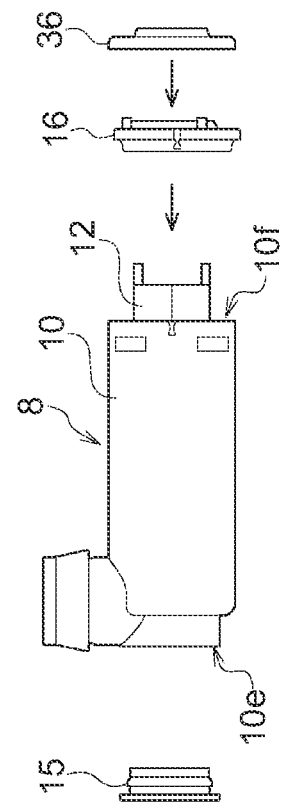
FIG. 4C is a view showing an assembly step of the vehicle washing device of FIG. 1.

As shown in FIG. 4C, the first cap 15 is mounted at the rear end of the cylinder tube 10 to close the opening 10e at the rear end of the cylinder tube 10. Further, the second cap 16 and the seal member 36 are mounted at the front end of the cylinder tube 10 to close the opening 10f at the front end of the cylinder tube 10.

Figure 4D:
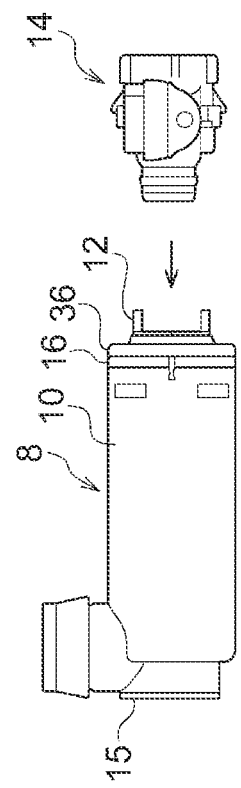
FIG. 4D is a view showing an assembly step of the vehicle washing device of FIG. 1.

As shown in FIG. 4D, the spray nozzle 14 is mounted on the front end side of the piston 12. Specifically, the rear end of the valve case 38 of the spray nozzle 14 is press-fitted onto the inner circumference of the piston tube 20.

Next, advantages offered by the embodiment will be described.

Figure 5A:
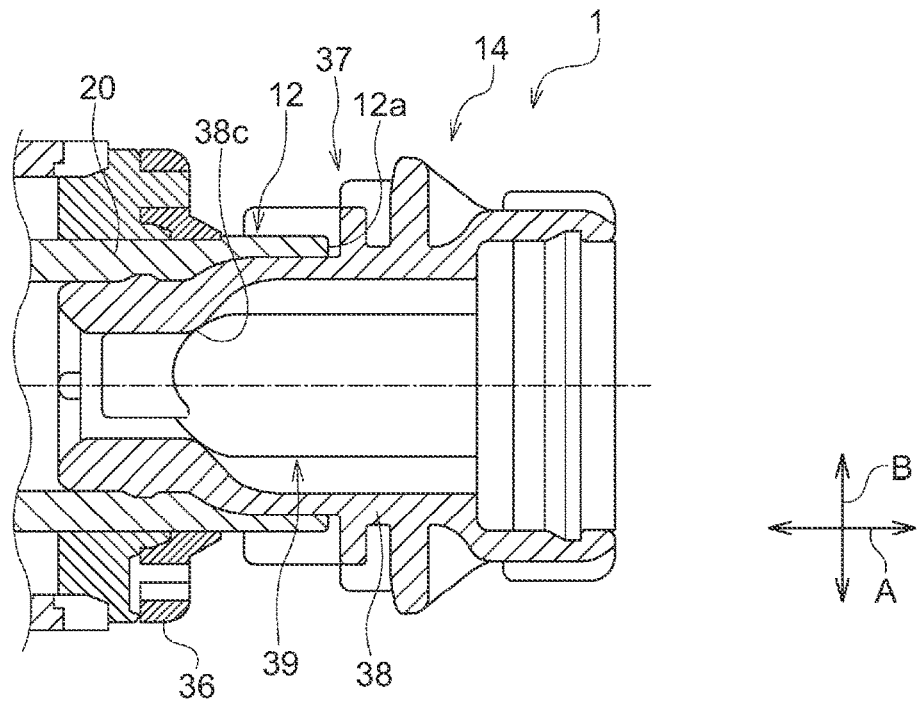
FIG. 5A is a view illustrating the advantages of the vehicle washing device of FIG. 1.
Figure 5B:
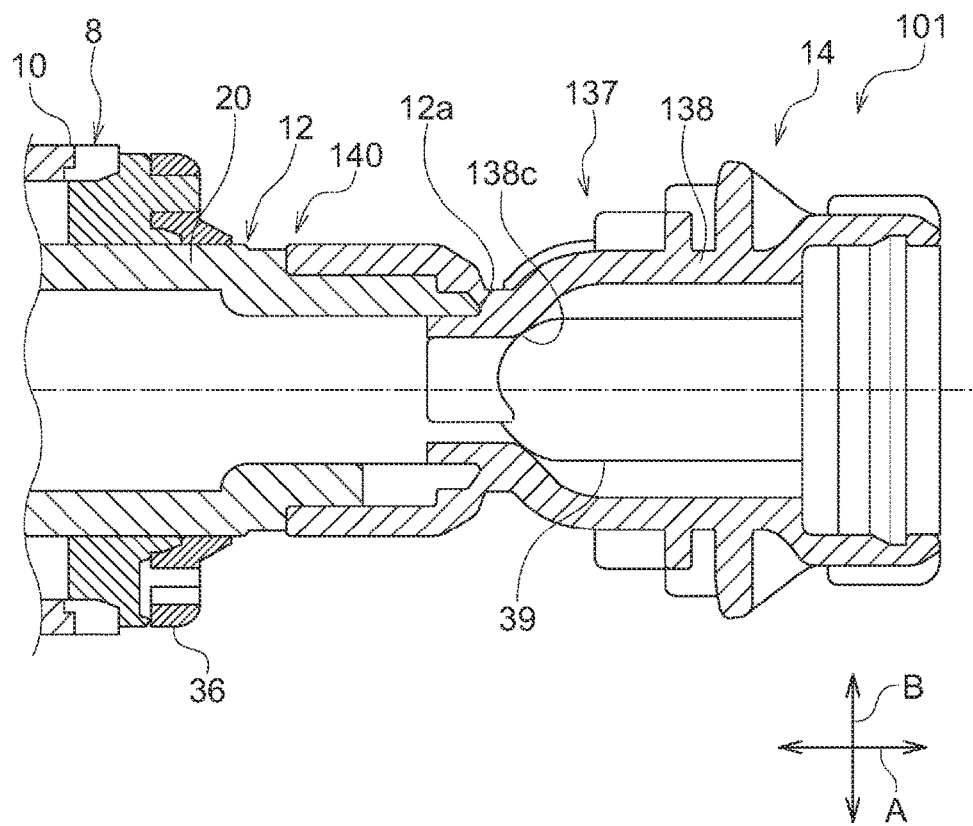
FIG. 5B is a view illustrating the advantages of the vehicle washing device of FIG. 1.

FIG. 5A and FIG. 5B are views illustrating the advantages of the vehicle washing device 1 according to the embodiment. FIG. 5A is a sectional view of the vehicle washing device 1 according to the embodiment, and FIG. 5B is a sectional view of a vehicle washing device 101 according to a comparative example.

In the vehicle washing device 101 according to the comparative example, an inner circumference on a rear end side of a valve case 138 of a valve 137 is fitted on an outer side of a front end side of the piston tube 20. In this case, a border 140 between the piston tube 20 and the valve case 138 is exposed on the outer circumference of the piston tube 20. The piston tube 20 is configured such that the seal member 36 does not cross this border.

In the vehicle washing device 1 according to the embodiment, by contrast, the outer circumference on the rear end side of the valve case 38 is fitted on the inner circumference on the front end side of the piston tube 20. Thus, unlike the comparative example, the border between the piston tube 20 and the valve case 38 is not exposed on the outer circumference of the piston tube 20. Therefore, the piston tube 20 can be housed into the cylinder tube 10 up to a point at which the seal member 36 is located near the front end of the piston tube 20. Thus, the overall length of the vehicle washing device 1 in the axial direction A when the piston 12 is in the housed position can be reduced while a length of stroke of the piston 12 equivalent to that in the comparative example is maintained.

In the vehicle washing device 101 according to the comparative example, a valve seat 138c is located outside (on the front side in the axial direction of) the piston tube 20. In this case, the length that the spray nozzle 14 protrudes from the piston tube 20 toward the front side in the axial direction is long, and so is the overall length of the vehicle washing device 1 in the axial direction A when the piston 12 is in the housed position.

In the vehicle washing device 1 according to the embodiment, by contrast, the valve seat 38c is located inside the piston tube 20. The valve seat 38c may be located on the radially inner side of the seal member 36, or rearward of the seal member 36 in the axial direction, when the piston 12 is in the housed position. That is, the valve seat 38c may be located on the radially inner side of the seal member 36, the second cap 16, or the cylinder tube 10. In these cases, the length that the spray nozzle 14 protrudes from the piston tube 20 toward the front side is reduced compared with that in the comparative example. Thus, the overall length of the vehicle washing device 1 in the axial direction A when the piston 12 is in the housed position can be reduced while a length of stroke of the piston 12 equivalent to that in the comparative example is maintained.

In the vehicle washing device 1 according to the embodiment, when the piston 12 is in the housed position, the rear end portion 20b of the piston tube 20 is located on the inner side of the flow passage 18a of the coupling part 18 in the radial direction B. The rear end portion 20b of the piston tube 20 may be located on the inner side of the inflow opening 10g in the radial direction B. In these cases, the length in the axial direction A that the piston tube 20 protrudes from the cylinder tube 10 when the piston 12 is in the housed position is short, and thus the overall length of the vehicle washing device 1 in the axial direction A when the piston 12 is in the housed position can be reduced.

In the vehicle washing device 1 according to the embodiment, when the piston 12 is in the housed position, the seal member 26 is located on the inner side of the flow passage 18a of the coupling part 18 in the radial direction B. In this case, the flange 22 can be provided so as to be located on a relatively rear side when the piston 12 is in the housed position, which can increase the length of stroke of the piston 12.

In the vehicle washing device 1 according to the embodiment, when the coupling part 18 is seen from the radial direction B, the annular engaging part 24c of the spring 24 is located on the inner side of the flow passage 18a in the radial direction B. The rear end 24d of the annular engaging part 24c may be located rearward of the inflow opening 10g in the axial direction. In these cases, the annular engaging part 24c of the spring 24 that is inserted through the opening 10e at the rear end of the cylinder tube 10 is fixed to the cylinder tube 10 at a position closer to the rear end thereof, so that the annular engaging part 24c can be fixed relatively easily.

The present invention has been described above based on the embodiment. As will be understood by those skilled in the art, since this embodiment is an illustration, various modified examples are possible in terms of combinations of the constituent elements and the processes of the embodiment, and such modified examples are also included in the scope of the present invention.

What is claimed is:

1. A vehicle washing device comprising:
   a cylinder including a cylinder tube to which a washing fluid is supplied;
   a piston including a piston tube that is movably inserted into the cylinder tube and opens at both ends;
   a spray nozzle that is mounted at a leading end, in an extension direction, of the piston tube protruding from the cylinder tube, the spray nozzle being configured to spray the washing fluid, supplied through an inside of the piston tube, toward an object-to-be-washed; and
   a spring that is housed inside the piston tube and urges the piston toward a side opposite from the spray nozzle, wherein
   an outer circumference of the spray nozzle is fitted on an inner circumference of the piston tube;
   the spring is fixed at first end on a side of the cylinder tube opposite from the spray nozzle and provided at a second end with a hook-shaped catching part.

2. A vehicle washing device comprising:
   a cylinder including a cylinder tube to which a washing fluid is supplied;
   a piston including a piston tube that is movably inserted into the cylinder tube and opens at both ends; and
   a spray nozzle that is mounted at a leading end, in an extension direction, of the piston tube protruding from the cylinder tube, the spray nozzle being configured to spray the washing fluid, supplied through an inside of the piston tube, toward an object-to-be-washed, wherein
   an outer circumference of the spray nozzle is fitted on an inner circumference of the piston tube;
   the spray nozzle includes a valve configured to control a flow of the washing fluid from the piston tube to the spray nozzle;
   the valve includes a tubular valve case of which one end is fitted into the piston tube, and a valve seat that is formed in an inner wall surface of the valve case; and
   the valve seat is located inside the piston.

3. The vehicle washing device according to claim 2, wherein:
   the cylinder tube has an opening that opens toward the spray nozzle in an extension direction of the cylinder tube, and includes a cap that closes a gap between the cylinder tube and the piston tube in the opening and a seal member that creates a seal between the piston tube and the cap; and
   the valve seat is located inside at least one of the seal member, the cap, and the piston when the piston is in a housed position.

4. The vehicle washing device according to claim 1, wherein:
   the catching part is engaged with a spring hook provided inside the piston tube by being hung on the spring hook; and
   the spray nozzle is provided with a restricting part configured to restrict shift of the catching part toward the spray nozzle so as to keep the catching part and the spring hook from disengaging from each other.

* * * * *